June 6, 1950  H. C. RASSMANN  2,510,658
SEED FEEDER
Filed July 20, 1944  2 Sheets-Sheet 1
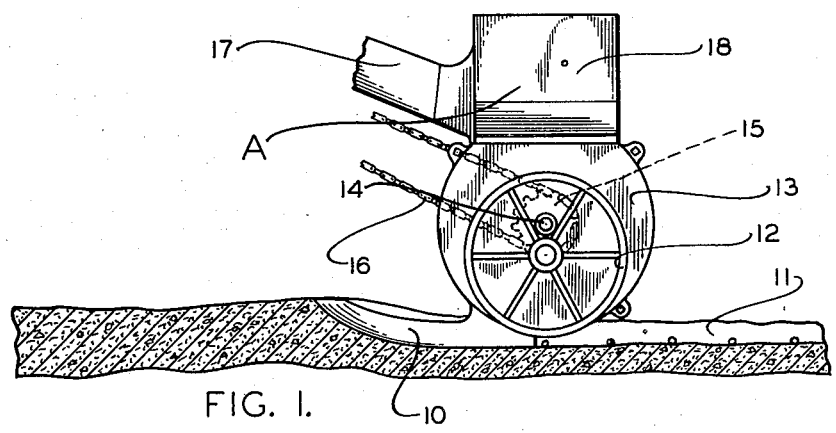
FIG. 1.
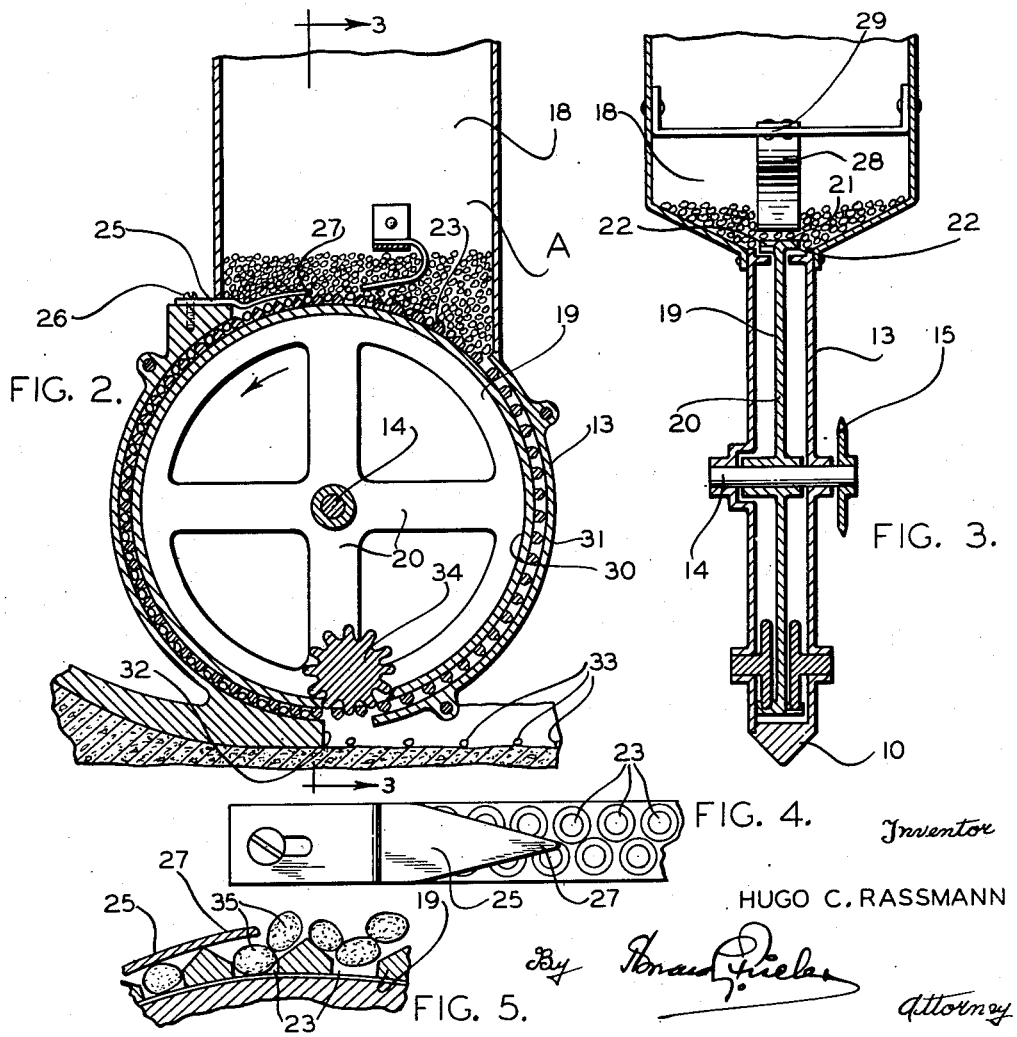
Inventor
HUGO C. RASSMANN June 6, 1950   H. C. RASSMANN   2,510,658
SEED FEEDER
Filed July 20, 1944   2 Sheets-Sheet 2
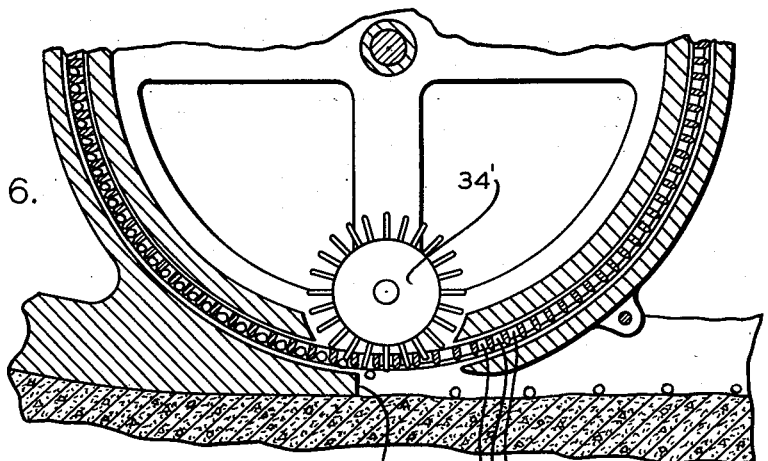
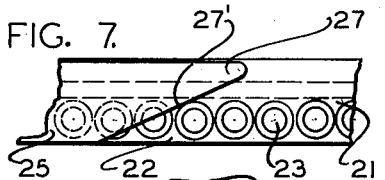
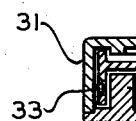
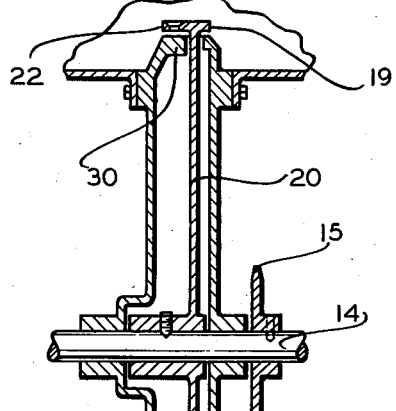
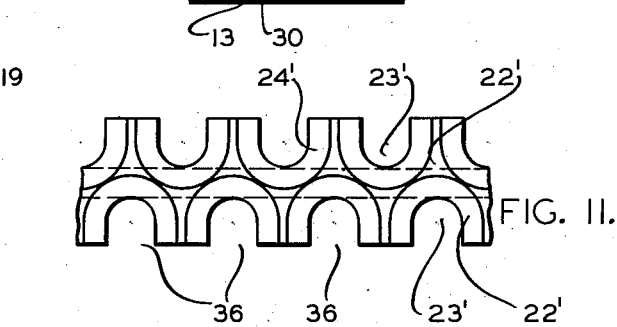
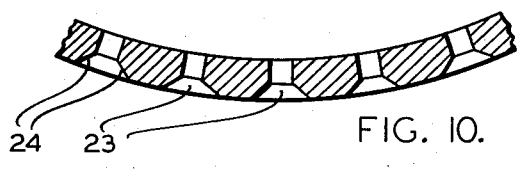
Inventor
HUGO C. RASSMANN Patented June 6, 1950

2,510,658

UNITED STATES PATENT OFFICE 2,510,658

SEED FEEDER

Hugo C. Rassmann, Minneapolis, Minn.

Application July 20, 1944, Serial No. 545,782

6 Claims. (Cl. 222—9)

My invention relates to an improvement in seed feeders wherein I provide a means of causing the seeds to enter pockets in a rotor which carries the seeds around to the planting position where they are ejected.

A feature of this invention resides in providing a resilient means which rides under spring tension over the surface of the rotor and acts as a guard to prevent more than one seed entering the respective seed pockets in the rotor.

Further, the invention includes a means adapted to spread the seeds out over the surface of the rotor in a manner to urge the seeds into the pockets as the rotor revolves in operation.

My seeder is designed to be used for planting beet seeds which are ordinarily small, having a rough or fuzzy texture, making it difficult to plant the seeds singularly. Therefore, it is a feature of my invention to provide a seeder being formed with a seed receiving rotor or wheel having seed pockets formed in the rim of the wheel, each pocket being beveled from the outer surface of the rim toward the inside of the pocket so as to permit the seeds to freely roll into or enter the seed pockets in the rim. When the seeds are in the pockets, it is desirable that not more than one seed be in each pocket and to more readily accomplish this operation, I provide a spring blade member which is adapted to ride under spring tension over the surface of the seed receiving flange above the seed pockets formed in the rotor wheel which acts as a guard to prevent more than a single seed remaining in the pocket as the rotor revolves to carry the seeds into planting position at the lower portion of the seed carrying rotor.

As the rotor revolves the upper portion thereof enters the seed chamber of the hopper. Each seed pocket is formed with an upper beveled surface so that the seeds can readily roll into the respective pockets. Within the seed hopper I provide a spreader or guard which is sufficiently rigid to act in a manner to wipe the seeds into the pockets. As the rotor revolves, the guard tends to push the seeds into the pockets and the spring blade which rides on the surface of the rotor above the pockets will push the excess seeds out of the pockets, leaving a single seed in each seed pocket. Then, in the rotation of the seed carrying rotor, the flange of the same passes between an inner arcuated guide and an outer casing arcuated guide so that the seeds are kept retained in the pockets until that portion containing the seeds reaches the bottom of the planter, whereupon the seeds are ejected by an ejecting wheel in very close proximity to the furrow in which the seeds are planted.

My planter can be equipped with interchangeable rotors, the various rotors having different sized holes to accommodate the different seeds. Thus, the rotor for planting beet seeds would have a small pocket in proportion to the beet seeds to be planted, whereas a seeder for beans or peas would have the proper sized seed pocket formed in the rim of the rotor, so that a single seed may enter each pocket as the rotor is revolved through said hopper.

My seeder may be formed with a rotor having a single planting rim wherein a series of seed pockets are formed in said rim, or the rotor may be formed with a double flange projecting on either side of the spokes of the rotor and formed with seed receiving pockets in each of the respective flanges. While I have found it desirable to have the seed pockets formed in the rim of the rotor substantially round so as to engage around the sides of the seed, I have also found that the seed pockets may be formed open on the outer edge of the rim. In the open type of pocket, seeds may be received into the same from the sides as well as from the top of the periphery of the rotor and the seeds may be ejected in the same manner, either from the side or directly out of the pocket when the seed-bearing portion of the rotor is in planting position.

It is a feature of my invention to provide a planter having a substantially accurate means for receiving single seeds into each seed pocket of the rotor, and to eject the seeds out of the pockets into the planting furrow with virtually as small a drop as possible from the seed pocket of the rotor to the bottom of the furrow. This permits the seeds to be accurately planted so that they are spaced a predetermined distance apart. In planting seeds in this manner, I eliminate the necessity of blocking the plants in the rows and each seed is given a chance to develop into a healthy plant. This is important in beet seeds, as well as in other types of seeds.

It is apparent that my seeder may be made in a manner to plant any type of seeds where it is desirable to space each seed a predetermined distance apart.

It also is a feature to provide a spring guard blade for removing the excess seeds from the pockets as the rotor revolves, which blade is adjustable outside of the seed pocket with the spring operating end of the blade extending into the seed pocket and riding under spring tension on the outer surface of the rotor in which the pockets are formed.

These features, together with other details and specifications of my invention, will be fully set forth through the specification and claims.

In the drawings forming part of my specification:

Figure 1 illustrates my seeder in operation along the ground in which the seed carrying rotor is operated to accurately drop and plant the seeds in spaced relation in the seed furrow.

Figure 2 is an enlarged sectional detail centrally through my seeder and the seed hopper to indicate the working parts.

Figure 3 is a section on the line 3—3 of Figure 2.

Figure 4 is a detail looking down on a portion of the surface of the double flanged planting rotor and showing the spring guard blade in the form used for the double row of seed pockets.

Figure 5 is a sectional detail of a portion of a rotor showing the seed pockets formed to receive peas or beans and also illustrates a portion of the spring guard blade to show the manner in which the blade pushes the excess seeds out of the mouth of the pockets.

Figure 6 is a sectional detail showing the seeder in operation and ejecting the seeds from the rotor, showing the manner in which the seeds are ejected in very close proximity to the bottom of the furrow in which they are planted.

Figure 7 is a surface view of a portion of the single row of seed pockets in the single flange of the rotor.

Figure 8 is a detail section of the casing of the seeder and the single seed-receiving pocket rim shown in Figure 7.

Figure 9 is a vertical section through a portion of the seed hopper through the seed-receiving rotor and showing the lower plow end of the seeder which opens the furrow in the ground for the seeds.

Figure 10 is a detail section of a portion of the seed pocket rim of the rotor.

Figure 11 illustrates the alternative form of said pocket rim where the seed pockets are opened on the outer edge.

The seeder A is adapted to move along the ground with the plow 10 operating to open a furrow 11 in the ground. The wheels 12 are positioned on either side of the rotor casing 13 (only one of which is shown). The wheels 12 are adapted to ride on the ground and limit the depth of the plow 10 which forms the furrow.

A shaft 14 descends through the casing 13 and is driven by the sprocket 15 through the medium of the chain 16 from a source of power (not shown).

This seeder is an improvement on my Patent 2,106,901, dated February 1, 1938, and my application, Serial No. 510,151, filed November 13, 1943, for Seed planters. My seeder is adapted to be drawn over the ground by any suitable means and is provided with a drawbar connection 17 so that the seeder A may be drawn along the ground to plant the seeds in the furrow 11.

The seeder A is provided with a seed hopper 18 which is positioned directly above the casing 13 in which the seed carrying rotor 19 is positioned and which operates on the shaft 14. The rotor 19 is formed with spokes 20 which support the annular rim 21. The rim 21 may be formed with a single seed pocket flange 22 projecting at right angles to the outer ends of the spokes 20 as illustrated in Figure 9, or the rim 21 may be formed with a pair of flanges 22 projecting from either side of the spokes 20 as illustrated in Figure 3.

The seeder A ordinarily employs a rotor 19 with a single flange 22 as illustrated in Figure 9. In this form of rotor 19, a series of seed pockets 23 are formed in the rim 22, pockets extending through the rim being adapted to be of a size to receive the particular kind of seeds which it is desired to plant. Each pocket 23 is formed with an outer beveled mouth 24 to freely admit the seeds into the pockets 23 and also to permit excess seeds to be pushed out of the opening of the pocket as the rotor 19 is rotated in the casing 13. It will be apparent that when the seeder is used to plant beet seeds, the seed pockets 23 will be of a size just sufficiently large to receive a single beet seed in the body of the pocket 23. When it is desired to plant beans, peas or other seeds, the pockets 23 will have to be formed in proportion to the size of the average individual seeds.

The seeder A is made so that it can be readily taken apart and a different rotor 19 inserted in the same.

I provide the seeder A with an adjustable spring blade member 25 which is adjustably supported by the screw 26 just outside of the seed hopper 18 while the blade 25 extends into the hopper and the free end 27 of the same is adapted to ride under spring tension over the surface of the rim 22 across the pockets 23. This spring blade is adapted to prevent more than one seed entering each pocket 23 as the rotor 19 is rotated in the seeder A.

I also provide within the seed hopper 18 a seed spreader blade 28 which is supported by the bracket 29 extending between the side walls of the seed hopper 18. This spreader 28 may be rigid or of a spring nature and is adapted to have its free end positioned in close proximity to the outer surface of the rim 22 of the rotor 19 and its function is to spread the seeds over the rim 21 to cause the seeds to enter the pockets 23 prior to the contact point of the free end 27 of spring blade 25. In this manner I provide a means for insuring the seeds falling in to all of the pockets 23 before that portion of the rotor 19 which passes through the seed hopper 18 travels down into seed planting position.

The casing 13 is provided with an inner flange 30 over which the rim 22 rides and acts to hold the seeds in the pockets 23. The outer flange 31 formed by the casing 13 keeps the seeds from jumping out of the pockets 23 as the rotor 19 is revolved in the casing 13.

At the lower side of the casing 13, the outer flange 31 is cut away to form the opening 32 so that the seeds 33 may fall out of the pockets 23 as the pockets reach the lower planting position in the rotation of the rotor 19. To insure the seeds being ejected out of the pockets 23, I provide an ejector wheel 34 which has teeth which enter the back of the pockets 23 and force the seeds out of the pockets if the seed is inclined to stick in the same. This insures the dropping of the seeds 33 at predetermined intervals so that the seeds may be planted a predetermined distance apart, and thus give the plants developed from the seeds 33 the proper amount of space between each other so as to permit the plants to fully develop.

Where I employ a double seed rim as illustrated in Figures 3 and 4, the spring guard blade 25 has its outer free end 27 pointed as illustrated in Figure 4. Beveled sides of the end of the guard blade act to push the excess seeds out of the pockets 23. Where a single row of pockets are employed as illustrated in Figures 7 and 9, the spring guard blade 25 may have a single beveled surface 27' which is adapted to push the excess seeds out of the pockets 23.

In Figure 5, I have illustrated the rotor 19 with larger size pockets 23 for receiving pea seeds 35, and in this figure I show the guard blade 25 acting to ride on the surface of the rotor 19 and to push the excess seeds 35 out of the pockets 23. It will be apparent that the beveled mouth openings 24 of the pockets 23 permit the seeds to enter the pockets freely and also to permit the guard 25 to push the excess seeds out of the pockets as the rotor 19 rotates in the seeder A.

The spring guard 25 is of primary importance in this invention, together with the spreader blade 28, as I have found it is desirable to have the guard blade 25 ride closely over the outer surface of the pockets 23 to insure the admission of only a single seed into each pocket 23. The guard blade 25 also prevents the seeds 33 or 35 from being ground up by the rotor as it passes through the seed pocket 18, and thus my seeder is economical in its operation.

In Figure 11 I have illustrated a pair of seed-receiving rims 22' having the seed pockets 23' open at the outer edge 36. This form of seed pocket may be desired in some cases for particular kinds of seeds, as it will be apparent that the seeds may be induced into the seed pockets 23' from the side as well as from the top, and the surplus may be ejected in the same manner. The seed pockets 23' are formed with beveled mouth portions 24' operated in the same manner as the seed pockets 23.

In Figure 8 I have shown the casing 13 in section of a detail to show the manner in which the outer flange 31 closes the outside of the pockets and the inner flange 30 closes the inside of the pockets to retain the seeds 33 or 35 within the pockets 23 as the rotor rotates from the seed hopper 18 down to the seed planting position at the bottom opening 32 of the seeder A.

In Figure 6 I have also shown a different form of ejector wheel 34' for ejecting the seeds out of the pockets 23.

In accordance with the patent statutes, I have described the plans of operation of my invention, together with the details of primary importance and I desire to have the scope of this patent extend to such apparent changes to those skilled in this art and within the scope of the following claims.

I claim:

1. A seeder, including a seed receptacle, a rotor rotatable in a vertical plane having a circular rim means formed at right angles to said rotor adapted to intercept said receptacle, a series of seed openings in said transverse rim, means for gathering seeds one at a time into said seed openings in said rim, and a bevelled spring deflector formed from a flat piece of metal arcuated to conform with said circular rim and adapted throughout the major portion of its length to ride on the surface of said rim means to wipe off excess seeds from said rim means.

2. A seeder, including a seed receptacle, a rotor rotatable in a vertical plane adapted to intercept said receptacle, a flat steel beveled spring guard adapted for a major portion of its length to ride on the surface of said rotor, a series of seed pockets formed in said rotor having outer annular flared mouth openings for receiving the seeds freely into the openings in said rotor, a seed spreader means positioned with its free end in close proximity to the surface of said rotor wherein the seed pockets are formed to spread the seeds in said receptacle in a manner to cause them to freely enter the seed pockets in said rotor.

3. A seeder, comprising a seed hopper, a rotor rotatable in a vertical plane positioned below said seed hopper and being adapted to be rotated in a manner to intercept said hopper, a series of seed pockets formed in said rotor, flange means depending from said seed hopper for holding seeds in said pockets to carry the seeds to the bottom of the seeder, and a long arcuated spring deflector means having a longitudinally extending angular wiping free edge adapted to ride on the surface of said rotor inside of said seed hopper to prevent more than one seed entering each of the seed pockets in said rotor.

4. A seeder, including a seed hopper, a seed-receiving rotor rotatable in a vertical plane having transversely extending flange means, a series of seed receiving cells formed in said flange means, beveled outer openings leading into each of said receiving cells around the margin of the receiving cell to permit the seeds to freely enter the seed receiving cells and to permit excess seeds to be pushed away from said receiving cells, and an adjustable spring guard plate adapted to ride on a portion of the outer surface of said seed receiving cells of said rotor and a longitudinally extending angular wiping free edge on said guard adapted to push excess seeds gradually from seed pockets.

5. A seeder having interchangeable seed carrying means to permit different size seeds to be planted by said seeder, said seed carrying means including a rotor, rotatable in a vertical plane a series of seed pockets formed in said rotor, a flared outer marginal edge for each of said seed pockets, means for rotating said rotor through the seed hopper of the said seeder to gather seeds into said pockets, arcuated spring means having a longitudinally inclined free end for pushing excess seeds out of said pockets, fixed means curved to fit over and in contact with the seed pockets of said rotor and adjacent the free end of said spring means for spreading the seeds in the seed hopper over the surface of said rotor to push seeds into said pockets, a seed dropping opening in the bottom of said seed carrying means in close proximity to the ground in which the seed is planted and means for positively ejecting the seeds out of said pockets to plant the same.

6. A seeder, including a seed hopper, a rotor rotatable in a vertical plane adapted to intercept said hopper, a rim formed on said rotor having two rows of seed receiving cells formed in said rim, flange means secured to said hopper for holding seeds in said cells to carry the seeds to the bottom of the planter, a pointed arcuated spring deflector positioned to ride on the surface of said rim inside said seed hopper, the point of said deflector being positioned intermediate the two rows of seed receiving cells to prevent more than one seed from entering any of said seed receiving cells in said rim.

HUGO C. RASSMANN.

REFERENCES CITED

The following references are of record in the file of this patent:

UNITED STATES PATENTS

| Number | Name | Date |
|---|---|---|
| 47,855 | Prentice | May 23, 1865 |
| 135,178 | Vanneys | Jan. 21, 1873 |
| 835,040 | Snyder | Nov. 6, 1906 |
| 982,089 | Patric | Jan. 17, 1911 |
| 1,397,689 | Krotz | Nov. 22, 1921 |
| 1,997,791 | Hoberg | Apr. 16, 1935 |

FOREIGN PATENTS

| Number | Country | Date |
|---|---|---|
| 18,381 | Great Britain | Oct. 20, 1904 |